US008271238B2

(12) United States Patent
Zhang (10) Patent No.: US 8,271,238 B2
(45) Date of Patent: Sep. 18, 2012

(54) FINITE DIFFERENCE SCHEME FOR SOLVING DROPLET EVAPORATION LUBRICATION EQUATIONS ON A TIME-DEPENDENT VARYING DOMAIN

(75) Inventor: Jie Zhang, Santa Clara, CA (US)

(73) Assignee: Seiko Epson Corporation, Tokyo (JP)

( * ) Notice: Subject to any disclaimer, the term of this patent is extended or adjusted under 35 U.S.C. 154(b) by 374 days.

(21) Appl. No.: 12/730,067

(22) Filed: Mar. 23, 2010

(65) Prior Publication Data

US 2011/0238389 A1    Sep. 29, 2011

(51) Int. Cl.
*G06F 17/10* (2006.01)
(52) U.S. Cl. .................................... 703/2; 703/9
(58) Field of Classification Search ............... 703/2, 9
See application file for complete search history.

(56) References Cited

U.S. PATENT DOCUMENTS

| | | | |
|---|---|---|---|
| 6,391,986 B1 | 5/2002 | Goode et al. | |
| 6,471,761 B2 | 10/2002 | Fan et al. | |
| 6,660,209 B2 | 12/2003 | Leyden et al. | |
| 6,754,551 B1 | 6/2004 | Zohar et al. | |
| 6,913,832 B2 | 7/2005 | Fan et al. | |
| 7,022,534 B2 | 4/2006 | Gupta et al. | |
| 7,085,695 B2 | 8/2006 | Yu et al. | |
| 7,117,138 B2 | 10/2006 | Yu et al. | |
| 7,147,306 B2 | 12/2006 | Silverbrook et al. | |
| 7,160,633 B2 | 1/2007 | Tai et al. | |
| 7,169,989 B2 | 1/2007 | Marks et al. | |
| 7,176,040 B2 | 2/2007 | Sirringhaus et al. | |
| 7,930,155 B2* | 4/2011 | Zhang et al. | 703/9 |
| 8,014,986 B2* | 9/2011 | Zhang et al. | 703/9 |
| 2005/0052120 A1 | 3/2005 | Gupta et al. | |
| 2006/0259288 A1 | 11/2006 | Yu | |
| 2007/0043544 A1 | 2/2007 | Song et al. | |
| 2007/0136042 A1 | 6/2007 | Yu | |
| 2007/0239414 A1 | 10/2007 | Song et al. | |
| 2007/0250296 A1 | 10/2007 | Shima et al. | |
| 2010/0250203 A1* | 9/2010 | Zhang et al. | 703/2 |
| 2011/0093241 A1* | 4/2011 | Zhang et al. | 703/2 |
| 2011/0131019 A1* | 6/2011 | Yu | 703/2 |
| 2011/0196657 A1* | 8/2011 | Zhang et al. | 703/2 |

FOREIGN PATENT DOCUMENTS

| | | |
|---|---|---|
| EP | 0 765 236 B1 | 7/1999 |
| EP | 1 208 985 A2 | 5/2002 |
| JP | 10-256330 | 9/1998 |

OTHER PUBLICATIONS

Reis Jr. et al., N.C. Numerical Simulation of the Impact of Liquid Droplets on Porous Surfaces, Journal of Computational Physics, vol. 198, Iss. 2, Aug. 2004, pp. 747-770.*

(Continued)

*Primary Examiner* — Russell Frejd (57) ABSTRACT

The present invention is directed to simulating evaporation of a droplet of a fluid, and may be embodied in a system, method or a computer-readable medium encoded with instructions for a processor to carry out such simulation. The present invention solves equations, which may represent an approximation of evaporation of the droplet on a domain whose size is varying over time. The boundaries of saturation regions are tracked and updated over time, and the equations are iteratively solved with the new boundaries of the saturation regions.

5 Claims, 4 Drawing Sheets

OTHER PUBLICATIONS

Tseng, F.G., et al., "A High-Resolution High-Frequency Monolithic Top-Shooting Microinjector Free of Satellite Drops—Part I: Concept, Design, and Model", Journal of Microelectromechanical Systems, vol. 11, No. 5, Oct. 2002, pp. 427-436.

Pasandideh-Fard, M., et al., "A three-dimensional model of droplet impact and solidification", International Journal of Heat and Mass Transfer 45, 2002, pp. 2229-2242.

Hu, H., et al., "Analysis of the Microfluid Flow in an Evaporating Sessile Droplet", Langmuir 2005, 21, pp. 3963-3971.

Hu, H., et al., "Analysis of the Effects of Marangoni Stresses on the Microflow in an Evaporating Sessile Droplet", Langmuir 2005, 21, pp. 3972-3980.

Deegan, R., et al., "Capillary flow as the cause of ring stains from dried liquid drops", Nature, vol. 389, Oct. 1997, pp. 827-829.

Deegan, R., et al., "Capillary flow as the cause of ring stains from dried liquid drops", James Franck Institute, Chicago, IL, Jul. 15, 1997, pp. 1-4.

Popov, Y.O., et al., "Characteristic Angles in the Wetting of an Angular Region: Deposit Growth", Department of Physics, University of Chicago, Jun. 6, 2003, pp. 1-36.

Deegan, R., et al., "Contact line deposits in an evaporating drop", Physical Review E., vol. 62, No. 1, Jul. 2000, pp. 756-765.

Sultan, E., et al., "Diffusion-limited evaporation of thin polar liquid films", Journal of Engineering Mathematics 50: 2004, pp. 209-222.

Widjaja, E., et al., "Dynamics of sessile droplet evaporation: A comparison of the spine and the elliptic mesh generation methods", Elsevier, Computers & Chemical Engineering 31, 2007, pp. 219-232.

Guena, G., et al., "Evaporation of sessile liquid droplets", Elsevier, Colloids and Surfaces A: Physicochem Eng. Aspects 291, 2006, pp. 191-196.

Hu, H., et al., "Evaporation of a Sessile Droplet on a Substrate", J. Phys. Chem. B, 2002, 106, pp. 1334-1344.

Schunk, P.R., et al., "Finite element modeling of evaporation and condensation during sol-gel film and fiber formation", VIII International Conference on Finite Elements in Fluids, Barcelona, Spain Sep. 20-24, 1993, pp. 1-12.

De Gans, Berend-Jan, et al., "Inkjet Printing of Polymers: State of the Art and Future Developments", Advanced Materials, 2004, 16, No. 3, Feb. 3, pp. 1-11.

Chernyak, V., "The Kinetic Theory of Droplet Evaporation", J. Aerosol Sci., vol. 26, No. 6, pp. 873-885, 1995.

Widjaja, E., et al., "Numerical study of vapor phase-diffusion driven sessile drop evaporation", Elsevier, Computers & Chemical Engineering 32, 2008, pp. 2169-2178.

Bayada, G., et al., "On a free boundary problem for the Reynolds equation derived from the Stokes system with Tresca boundary conditions" Journal of Mathematical Analysis and Applications, J. Math. Anal. Appl. 282, 2003, pp. 212-231.

Deegan, R., "Pattern formation in drying drops", Physical Review E, vol. 61, No. 1, Jan. 2000, pp. 475-485.

Percin, G., et al., "Piezoelectric droplet ejector for ink-jet printing of fluids and solid particles", Review of Scientific Instruments, vol. 74, No. 2, Feb. 2003, pp. 1120-1127.

Tarasevich, Y., "Simple analytical model of capillary flow in an evaporating sessile drop", Physical Review E 71, 027301, 2005, pp. 1-3.

Decent, S.P., "The spreading of a viscous microdrop on a solid surface", Microfluid Nanofluid, 2006, 2: 537-549.

Schwartz, L.W., "Theoretical and Numerical Modeling of Coating Flow on Simple and Complex Substrates including Rheology, Drying and Marangoni Effects", Advances in Coating and Drying of Thin Films, 1999, pp. 1-24.

Chen, C, et al., "Uniform Solute Deposition of Evaporable Droplet in Nanoliter Wells", Journal of Microelectromechanical Systems, vol. 16, No. 5, Oct. 2007, pp. 1209-1218.

Ozawa, K, et al., "Modeling of the Drying Process of Liquid Droplet to Form Thin Film", Japanese Journal of Applied Physics, vol. 44, No. 6A, 2005, pp. 4229-4234.

Fischer, B., "Particle Convection in an Evaporating Colloidal Droplet", Langmuir 2002, 18, pp. 60-67.

Liou, M., "A Generalized Procedure for Constructing an Upwind-Based TVD Scheme", 25th Aerospace Sciences Meeting, Jan. 12-15, 1987, pp. 1-27.

Harten, Ami, et al., "Uniformly High Order Accurate Essentially Non-Oscillatory Schemes III", Institute for Computer Applications in Science and Engineering NASA, Apr. 1986, pp. 1-99.

Chen, et al., "Evaporation evolution of volatile liquid droplets in nanoliter wells", Sensors and Actuators A 130-131 (2006) 12-19.

Bonn, D., et al., Wetting and Spreading, Review of Modern Physics, vol. 81, Apr.-Jun. 2009, pp. 739-805.

* cited by examiner

FINITE DIFFERENCE SCHEME FOR SOLVING DROPLET EVAPORATION LUBRICATION EQUATIONS ON A TIME-DEPENDENT VARYING DOMAIN

CROSS-REFERENCE TO RELATED APPLICATIONS

The present application is related to following U.S. patent applications: U.S. patent application Ser. No. 12/476,588, filed on Jun. 2, 2009, entitled "A Finite Difference Algorithm for Solving Lubrication Equations with Solute Diffusion," now U.S. Pat. No. 8,014,986; and U.S. patent application Ser. No. 12/579,645, filed Oct. 15, 2009, entitled "An Upwind Algorithm for Solving Lubrication Equations". Each such related application is incorporated by reference herein in its entirety.

BACKGROUND

1. Field of Invention

The present application is directed toward systems and methods for employing a finite difference scheme for simulating the evaporation of a droplet on a domain whose size is varying over time.

2. Description of Related Art

The industrial printing process includes the production of small ink droplets. Each ink droplet may contain one or more solvents and solutes. Such solute is a metal, polymer, other suitable material, or mixtures of such materials. Each ink droplet may be ejected onto a target area of a patterned substrate. After the droplets land, the solvent(s) evaporate(s) and a thin film of the solute is formed. Controlling the final pattern of the solute film is important to maintaining the quality and repeatability of the printing process. In order to control the final pattern of the solute film, it is important to understand how the final pattern is formed. To do so, it is important to understand the influence of factors that influence and control the formation of the final pattern, such as evaporation rate, initial droplet volume and shape, initial solute concentration, and contact line dynamics. Numerical simulations of the printing process are useful tools for understanding the influence of these factors and for developing the control process for printing.

In the later stage of the ink drying process, the aspect ratio of the droplet (the length of the droplet vs. its height) increases and becomes quite large. Lubrication theory, which is good for describing the physics of thin films, may be applied to describe the evaporation physics and greatly reduce the complexity of the simulation at this later stage. Lubrication theory is an approximation of the Navier-Stokes equation for thin films. The application of lubrication theory to droplet evaporation results in two equations: a fourth-order interface evolution equation that describes the evolution of droplet surface (or interface) considering the effects of evaporation rate, surface tension, and fluid viscosity; and second-order solute convection/diffusion equation that describes the motion of solute particles under the influence of fluid velocity and particle diffusion.

As observed in experiments, the evaporation of solvent drives solute to move toward the contact line regions where it accumulates. These regions and a center region of the droplet soon reach saturated concentration. Hence, the evaporation ceases in those regions. Therefore, the fluid equations remain valid only for the regions where the solute has not reached saturated concentration.

The present invention improves on previous work on finite difference methods for solving lubrication equations for droplet evaporation. Previously, the location of the contact line was fixed, as was the solution domain. Even if the regions near the contact line reach saturation, there is still a non-zero flow field in that region. The flow, though small, could introduce an error in simulation results in film thickness, especially when the solute concentration is high near the end of the evaporation process.

SUMMARY OF INVENTION

Accordingly, embodiments of the present invention explicitly track the boundaries of the solute saturation regions over time. Only inside of this boundary are fluid and solute equations solved. The no-slip boundary condition is enforced at these boundaries, which are varying over time. This modeling approach yields a better approximation of the physics of the evaporation process.

In one aspect, the invention involves a computer-readable medium encoded with instructions for execution by a processor to perform a method for simulating evaporation of a droplet of a fluid. The instructions, which may be in the form of software or hardware, comprise instructions for: tracking boundaries of saturation regions of the droplet; setting the boundaries at a first, initial time; solving, at the first initial time, a plurality of differential equations that represent diffusion in, and evaporation of, the droplet within the boundaries of the saturation regions through temporal and spatial discretization; comparing a solute concentration in each of the saturation regions with a gelation concentration for the solute; updating the boundaries based on the comparison; and solving, at a second or next time, the plurality of differential equations within the updated boundaries of the saturation regions through temporal and spatial discretization.

Preferably, the finite difference method is used in solving the plurality of differential equations, and the diffusion being represented is that of the solute in the droplet.

In some embodiments, the comparing, updating and solving at a second or next time instructions are iteratively executed until a final time is reached.

Another aspect of the invention is embodied in a system for simulating evaporation of a droplet of a fluid. The system comprises a processor configured to track, boundaries of saturation regions of the droplet; set the boundaries at a first, initial time; solve, at the first initial time, a plurality of differential equations that represent diffusion in, and evaporation of, the droplet within the boundaries of the saturation regions through temporal and spatial discretization; compare a solute concentration in each of the saturation regions with a gelation concentration for the solute; update the boundaries based on the comparison; and solve, at a second or next time, the plurality of differential equations within the updated boundaries of the saturation regions through temporal and spatial discretization. The system further comprises a display for displaying the simulation.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings like reference symbols refer to like parts.

DESCRIPTION OF THE PREFERRED EMBODIMENTS

Figure 1:
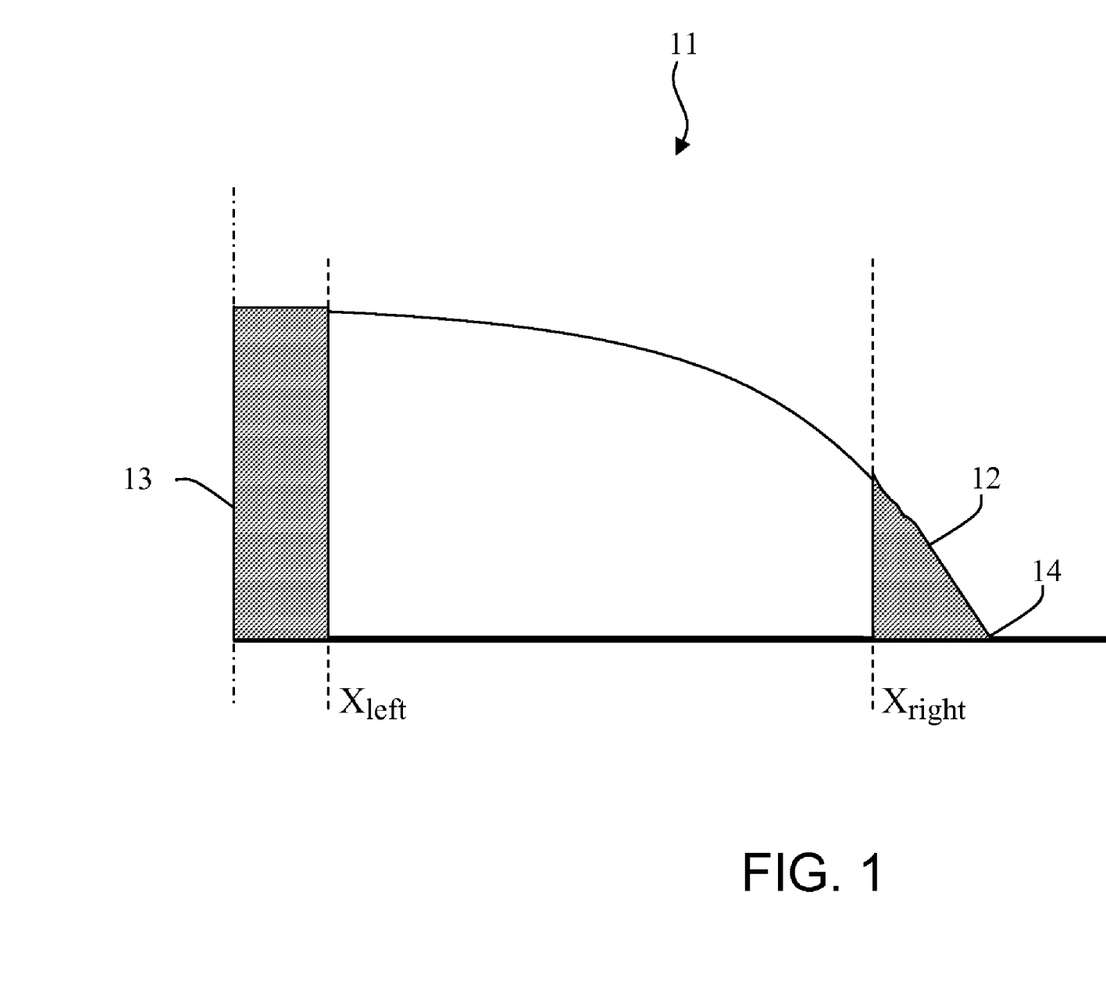
FIG. 1 is a schematically illustrated cross-sectional view of half a droplet, showing saturation regions.

As previously noted, there is solute accumulation near the end points or contact lines of a droplet, and these regions, as well as a center region of the droplet, reach saturated concentration first. FIG. 1 schematically illustrates in cross-section half of a droplet 11 having an end region 12 and a center region 13. The internal boundary of end region 12 is denoted $X_{right}$, and an internal boundary of center region 13 is denoted $X_{left}$. The outer boundary of end region 12 is a contact line 14, which is the interface between the fluid, substrate and air. It is to be understood that the other half of the droplet (not shown) would be symmetrical, and thus would include corresponding regions and boundaries. $X_{left}$ and $X_{right}$ are each a function of time and determined by the concentration value to the left and right, respectively.

Figure 2:
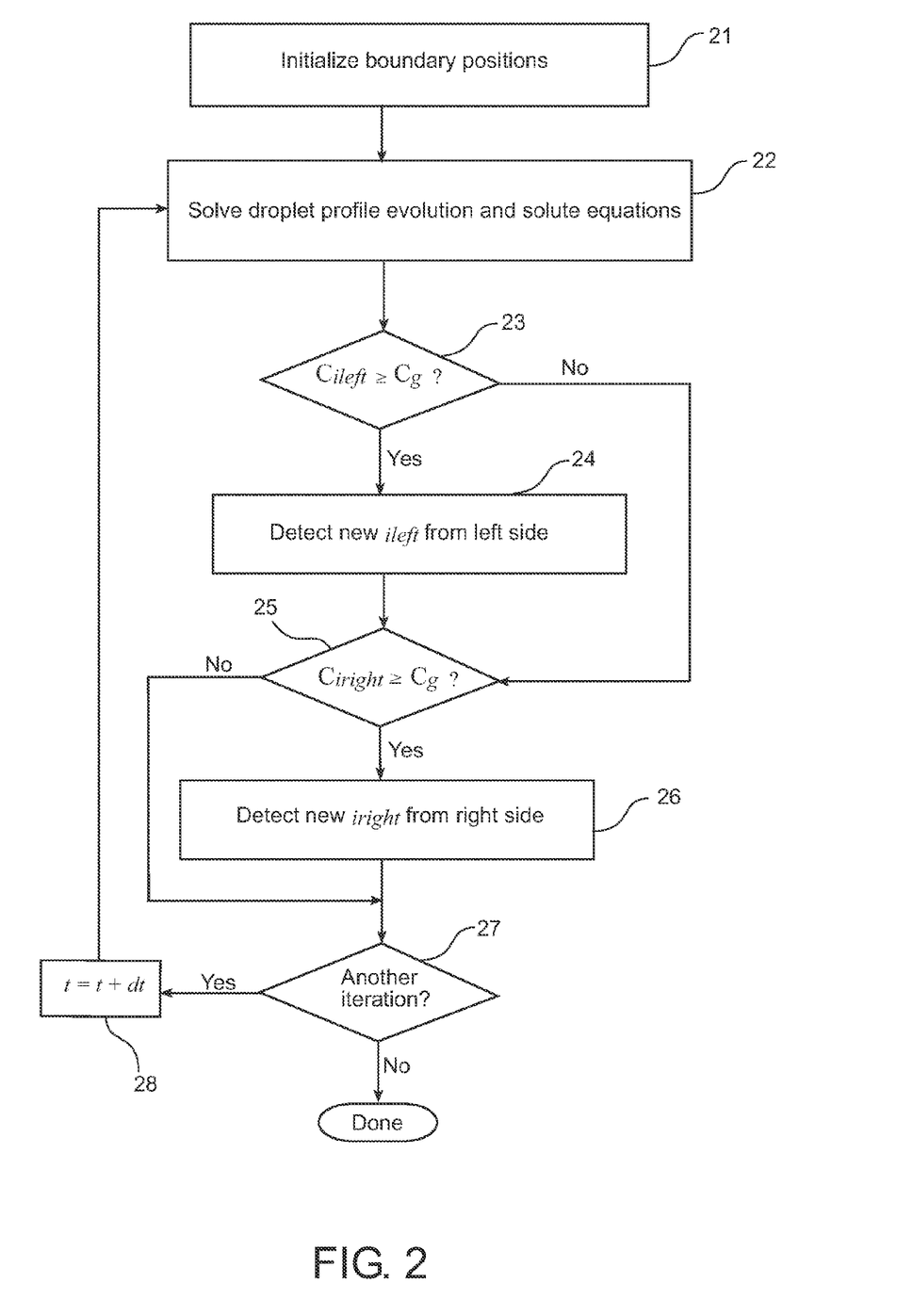
FIG. 2 is a flow chart illustrating a finite difference scheme for simulating a droplet evaporation process on a domain whose size is varying with time.

Referring now to FIG. 2, a finite-difference-based algorithm or method for simulating a droplet evaporation process on a domain whose size is varying with time begins at t=0, with initial boundary positions, i.e., $X_{left}$=0 and $X_{right}$=1; that is, no saturated regions (step 21). Step 22 entails solving the droplet profile evolution equation and solute equation on [$X_{left}$, $X_{right}$]. This step is described in much further detail below. In step 23, it is determined whether $C_{ileft} \geq C_g$ (the gelation concentration of the solute). If so, a new ileft is detected from the left side in step 24. After that, or in the case where $C_{ileft} < C_g$, flow proceeds to step 25, where it is determined if $C_{iright} \geq C_g$. If so, a new iright is detected form the right side in step 26. After that, or in the case where $C_{iright} < C_g$, flow proceeds to step 27, where it is determined whether another iteration is necessary. Steps 22-27 are iterated until either $C_{ileft}$ and $C_{iright}$ have both reached $C_g$, or until a final time is reached, so if neither contingency has been met, t is incremented by dt in step 28, and the process returns to step 22, where the equations are solved again at the new time. The algorithm concludes when no further iteration is required.

Thus, in accordance with the above algorithm, once a cell value of C reaches $C_g$, the applicable cell is counted out of the solution domain. In this way, the motion of moving the two end points is achieved.

Further description regarding step 22 and the variables used in the flow chart follows. In solving the droplet and solute equations (step 22), the axi-symmetric case is chosen to present the concepts. However, actual implementation may be done for the 2D case as well. The lubrication equations to be solved are given by equations (1) and (2) which, along with the other equations numerically-referenced below, are set forth in an Appendix of the specification. Proper boundary conditions apply at the two end points. The conditions are given in equations (3) and (4).

To solve the equations (step 22) time discretization is employed. To simplify the expressions, the symbolic terminology introduced in equations (5) and (6) are used to represent the right sides of equation (1) and (2), respectively. In equation (6), the term $\langle v_r \rangle$ is given by equation (7). Thus, there are two sub-steps of step 22: first, solve the lubrication equation (1) for $H^{n+1}$, and apply that solution to equation (8), in which $$J^n(r, t) = J_0 \left(1 - \frac{C^n(r, t)}{C_g}\right)^\alpha$$

and $C_g$ is the gelation concentration for the solute; next, use $H^{n+1}$ to solve $C^{n+1}$ according to equation (9).

In spatial discretization, for matrix M, equation (10) is solved, where certain terms are given by equations (11)-(14). Applying the boundary conditions set forth in (3) and (4) results in extra terms ($J_h$) on the right hand side of equation (8). Most of the $J_h$ components are zeros, except at ileft and iright, which are given by equations (15) and (16) respectively. The convection term in the solute equation is discretized as per equations (17) and (18). K is evaluated as previously described. When i=ileft, iright, $$\langle v_r \rangle_{ileft-\frac{1}{2}} = 0, \langle v_r \rangle_{iright+\frac{1}{2}} = 0$$

are applied. To evaluate the average velocity at the point next to the right boundary, apply $$\langle v_r \rangle_{iright-\frac{1}{2}} = \langle v_r \rangle_{iright-\frac{3}{2}}.$$

The diffusion term is $$\frac{1}{SC}\frac{1}{r}\frac{\partial}{\partial r}\left(r(H^{n+1} - f)\frac{\partial C^{n+1}}{\partial r}\right),$$

with C defined at the cell center, which is the same location as h and H. Hence, that yields equations (19)-(22). When an upwind scheme is selected, instead of solving for C, W is introduced. Equation (2) then becomes equation (23). Once W is solved, C can be obtained by dividing W by H−f. To simplify the expression, the following terms and symbols, set forth in equations (24)-(27), are adopted to represent portions of the right side of equation (2) and the right side of equation (23).

Thus, the sub-steps of step 22 of the algorithm become:
1. Obtain $C^n$ from W, according to equation (28);
2. Solve the lubrication equation (2) for $H^{n+1}$, according to equation (29); and
3. Use $H^{n+1}$ to calculate $W^{n+1}$, according to equation (30).

Note that the advection part of equation (26) is discretized by using an upwind scheme of equation (31), where $$\langle v_r \rangle^{n+1}_{i+\frac{1}{2}}$$

is evaluated as previously described, and the conditions of equations (32) and (33) hold.

When i=ileft, . . . , iright, $W_{ileft}$ and $W_{iright}$ will use the previous values as boundary conditions:

$$\langle v_r \rangle^{n+1}_{ileft-\frac{1}{2}} = \langle v_r \rangle^{n+1}_{iright+\frac{1}{2}} = 0.$$

To evaluate the average velocity at the point next to the right boundary, apply $$\langle v_r \rangle_{iright-\frac{1}{2}} = \langle v_r \rangle_{iright-\frac{3}{2}}.$$

In sub-step 3, the diffusion term, $$\frac{1}{SC}\frac{1}{r}\frac{\partial}{\partial r}\left(r(H^{n+1}-f)\frac{\partial\left(\frac{W^{n+1}}{H^{n+1}-f}\right)}{\partial r}\right),$$

is evaluated as per equations (34)-(37).

Numerical Results

Figure 3:
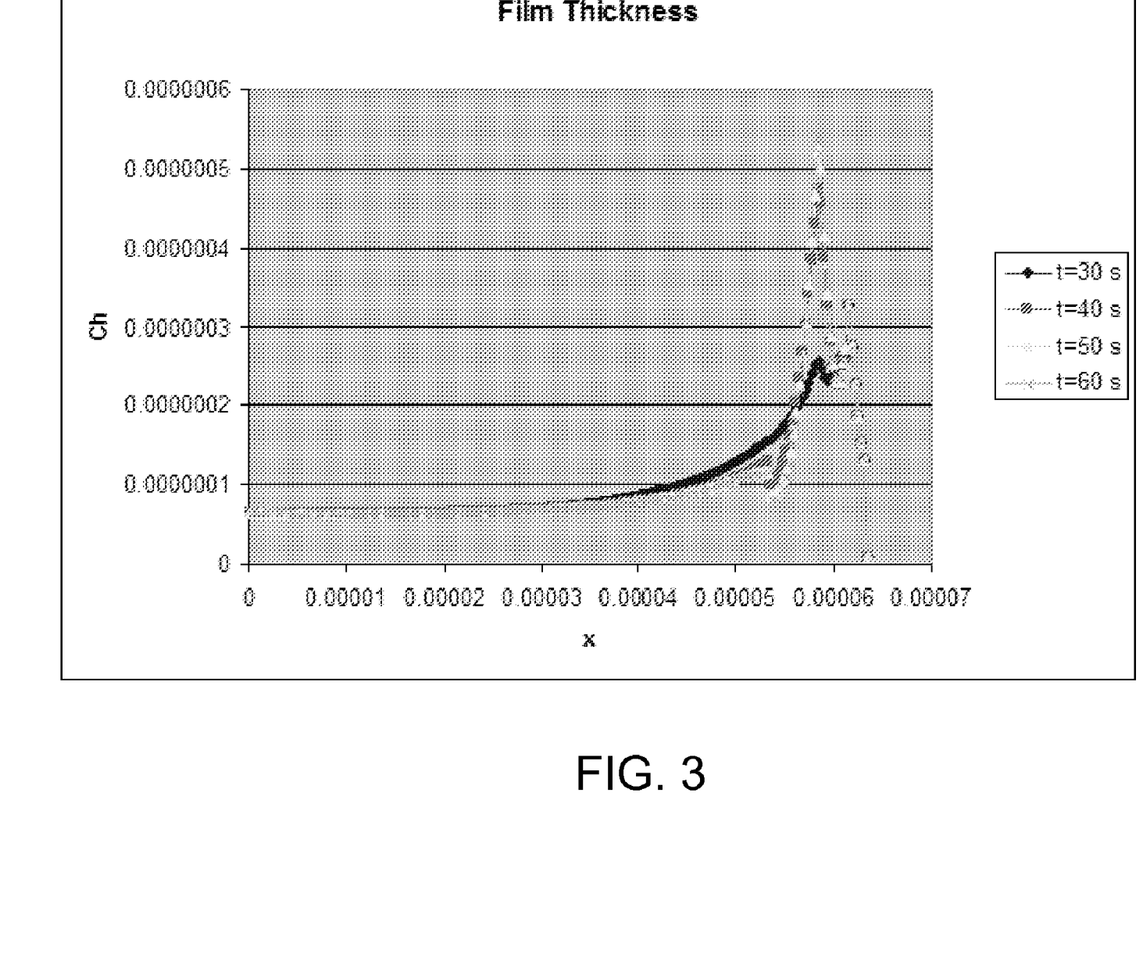
FIG. 3 is a graphical representation of thickness along the cross-sectional base of the droplet (x-axis) at different times during an evaporation process according to embodiments of the invention.

For a droplet evaporating on a complicated OLED structure, a 2D simulation of the cross-sectional profile for film thickness (Ch) is shown in FIG. 3. The dimensionless diffusion coefficient is set as follows: $Sc_0 = 0.01$. Droplet surface tension, $\sigma = 36.5 \times 10^{-3}$ N/m, and solvent viscosity, $\mu = 4.85 \times 10^{-3}$ Pa s. Here, the viscosity is varying over time, depending on an experimentally-measured relation: the specific viscosity varying with solute concentration. The initial droplet volume is $806.24 \times 10^{-12}$ m$^2$. The initial contact angle (at each point) is $32.8615°$. The initial evaporation rate, $J_0$, is $2 \times 10^{-11}$ m/s, and the dimensionless evaporation parameter, $E=0.5$. The final time is $t=60$ s. As shown in FIG. 3, the droplet profile forms a bump near the contact line region, which agrees with experimental observation.

As the foregoing demonstrates, the present invention offers improvements in approximating the droplet evaporation profile, which is very important in simulating droplet shape and internal flows for an evaporating droplet sitting on a complicated OLED bank in its final stage. The boundary of the solution domain is explicitly tracked and proper boundary conditions enforced, as the solution domain shrinks over time.

System

Figure 4:
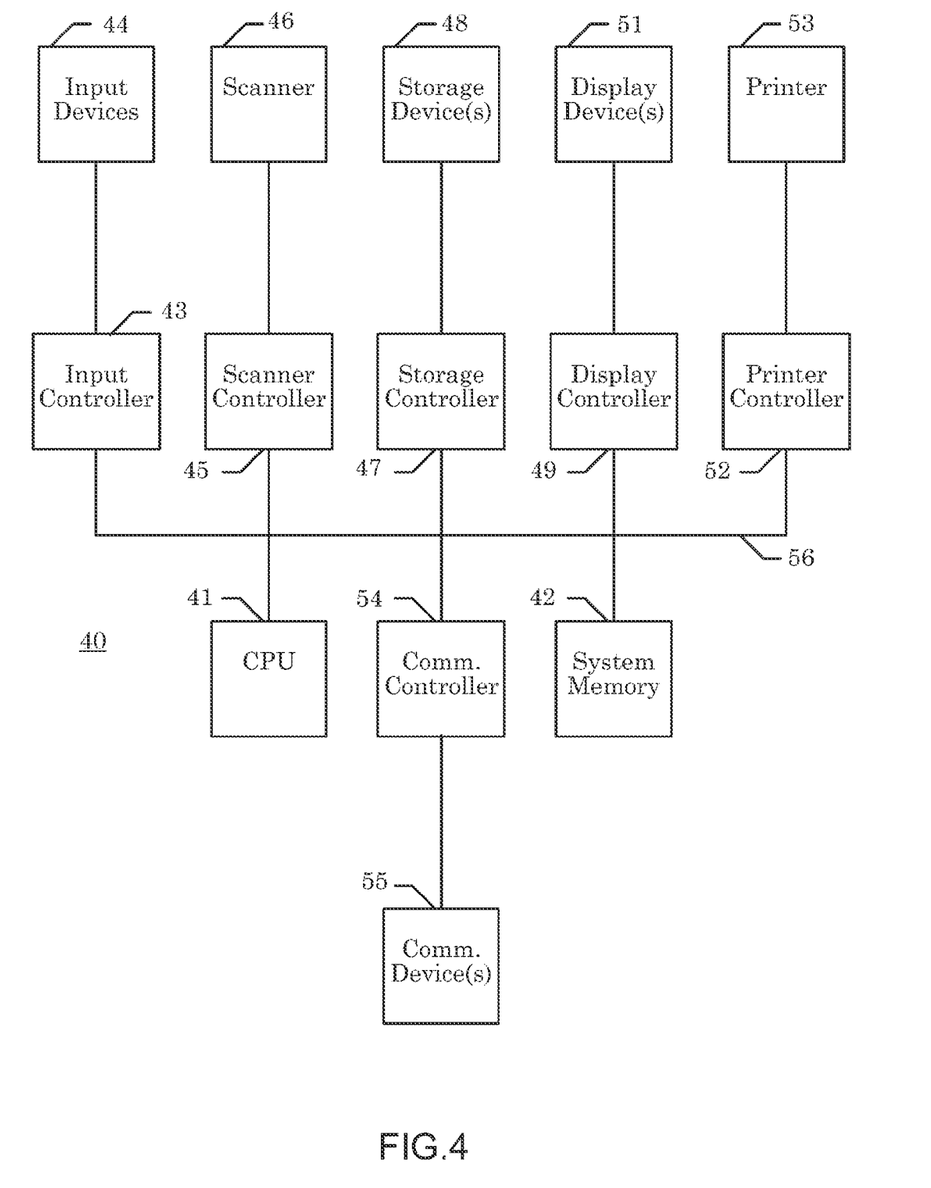
FIG. 4 is an illustration of a system on which embodiments of the present invention may be implemented.

Having described the details of the invention, an exemplary system 40, which may be used to implement aspects of the present invention, will now be described with reference to FIG. 4. As illustrated in FIG. 4, the system includes a central processing unit (CPU) 41 that provides computing resources and controls the computer. The CPU 41 may be implemented with a microprocessor or the like, and may also include a graphics processor and/or a floating point coprocessor for mathematical computations. System 40 may also include system memory 42, which may be in the form of random-access memory (RAM) and read-only memory (ROM).

A number of controllers and peripheral devices may also be provided, as shown in FIG. 4. An input controller 43 represents an interface to various input device(s) 44, such as a keyboard, mouse, or stylus. There may also be a scanner controller 45, which communicates with a scanner 46. System 40 may also include a storage controller 47 for interfacing with one or more storage devices 48 each of which includes a storage medium such as magnetic tape or disk, or an optical medium that might be used to record programs of instructions for operating systems, utilities and applications which may include embodiments of programs that implement various aspects of the present invention. Storage device(s) 48 may also be used to store processed data or data to be processed in accordance with the invention. System 40 may also include a display controller 49 for providing an interface to a display device 51, which may be of any known type, and may be conveniently used to view simulations carried out according to aspects of the present invention. System 40 may also include a printer controller 52 for communicating with a printer 53, which may be used to print simulation results. A communications controller 54 may interface with one or more communication devices 55 which enables system 40 to connect to remote devices through any of a variety of networks including the Internet, a local area network (LAN), a wide area network (WAN), or through any suitable electromagnetic carrier signals including infrared signals.

In the illustrated system, all major system components may connect to a bus 56, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the term "computer-readable medium" as used herein embraces instructions in the form of either software or hardware, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described algorithms, methods or steps thereof may be embodied in a program of instructions (e.g., software), which may be stored on, or conveyed to, a computer or other processor-controlled device for execution on a computer-readable medium. Alternatively, any of the methods or steps thereof may be implemented using functionally equivalent hardware (e.g., application specific integrated circuit (ASIC), digital signal processing circuitry, etc.) or a combination of software and hardware.

While the invention has been described in conjunction with several specific embodiments, it is evident that many further alternatives, modifications, and variations will be apparent to those skilled in the art in light of the foregoing description. Thus, the invention described herein is intended to embrace all such alternatives, modifications, and variations as may fall within the spirit and scope of the appended claims.

APPENDIX $$\frac{\partial H}{\partial t} = -\frac{1}{3Ca}\frac{1}{r}\frac{\partial}{\partial r}\left[\frac{r}{1+\eta_{sp}}(H-f)^3\frac{\partial}{\partial r}\left(\frac{\partial^2 H}{\partial r^2}+\frac{1}{r}\frac{\partial H}{\partial r}\right)\right] - EJ(r,t) \qquad 1$$

$$\frac{\partial[(H-f)C]}{\partial t} = -\frac{1}{3Ca}\frac{1}{r}\frac{\partial}{\partial r}\left\{\frac{r}{1+\eta_{sp}}(H-f)^3\frac{\partial}{\partial r}\left[\frac{1}{r}\frac{\partial}{\partial r}\left(r\frac{\partial H}{\partial r}\right)\right]C\right\} + \qquad 2$$
$$\frac{1}{Sc}\frac{1}{r}\frac{\partial}{\partial r}\left[r(H-f)\frac{\partial C}{\partial r}\right]$$

$$\frac{\partial H}{\partial r} = \frac{\partial f}{\partial r}, \frac{\partial^3 H}{\partial r^3} = \frac{\partial^3 f}{\partial r^3}, \frac{\partial C}{\partial r} = 0 \text{ at } r = X_{left} \quad (3)$$

$$\begin{cases} H = f & X_{right} = 1 \\ H = H_{iright+1} & X_{right} < 1, \end{cases} \quad (4)$$

$$(H - f)\langle v_r \rangle = 0 \text{ at } r = X_{right}$$

$$M^n H^{n+1} = -\frac{1}{3Ca}\frac{1}{r}\frac{\partial}{\partial r}\left[\frac{r}{1+\eta_{sp}}(H^n-f)^3\frac{\partial}{\partial r}\left(\frac{\partial^2 H^{n+1}}{\partial r^2}+\frac{1}{r}\frac{\partial H^{n+1}}{\partial r}\right)\right] \quad (5)$$

$$N^{n+1}C^{n+1} = \quad (6)$$
$$-\frac{1}{r}\frac{\partial}{\partial r}(r(H^{n+1}-f)\langle v_r\rangle^{n+1}C^{n+1}) + \frac{1}{Sc}\frac{1}{r}\frac{\partial}{\partial r}\left(r(H^{n+1}-f)\frac{\partial C^{n+1}}{\partial r}\right)$$

$$\langle v_r\rangle = \frac{1}{H-f}\int_f^H v_r dz = \frac{1}{3Ca}\frac{1}{1+\eta_{sp}}(H-f)^2\frac{\partial}{\partial r}\left(\frac{\partial^2 H}{\partial r^2}+\frac{1}{r}\frac{\partial H}{\partial r}\right) \quad (7)$$

$$[I - \Delta t M^n]H^{n+1} = [I + \Delta t J_h]H^n - \Delta t E J^n, \quad (8)$$

$$[(H^{n+1}-f)I - \Delta t N^{n+1}]C^{n+1} = [(H^{n+1}-f)I]C^n \quad (9)$$

$$\frac{1}{r}\frac{\partial}{\partial r}\left[\frac{r}{1+\eta_{sp}}(H^n-f)^3\frac{\partial}{\partial r}\left(\frac{\partial H^{n+1}}{\partial r^2}+\frac{1}{r}\frac{\partial H^{n+1}}{\partial r}\right)\right]_{x=x_i} = \quad (10)$$
$$\frac{1}{r_i\Delta r}\left[G|_{x=x_{i+\frac{1}{2}}} - G|_{x=x_{i-\frac{1}{2}}}\right]$$

$$G|_{x=x_{i+\frac{1}{2}}} = \frac{r_{i+\frac{1}{2}}}{1+\eta_{sp_{i+\frac{1}{2}}}}\left(\frac{H_i^n + H_{i+1}^n}{2} - f_{i+\frac{1}{2}}\right)^3\frac{1}{\Delta r}(K|_{x=x_{i+1}} - K|_{x=x_i}) \quad (11)$$

$$K|_{x=x_i} = \frac{H_{i+1}^{n+1} - 2H_i^{n+1} + H_{i-1}^{n+1}}{\Delta r^2} + \frac{H_{i+1}^{n+1} - H_{i-1}^{n+1}}{2r_i\Delta r} \quad (12)$$
$$\text{for } i = ileft+1, \ldots, iright-1$$

$$\text{And } K|_{x=x_{ileft}} = \frac{H_{ileft+1}^{n+1} - H_{ileft}^{n+1}}{\Delta r^2} + \frac{H_{ileft+1}^{n+1} - H_{ileft}^{n+1}}{2r_{ileft}\Delta r} \quad (13)$$

$$K|_{x=x_{iright}} = \frac{-2H_{iright}^{n+1} + H_{iright-1}^{n+1}}{\Delta r^2} + \frac{-H_{iright-1}^{n+1}}{2r_{iright}\Delta r} \quad (14)$$

$$J_h|_{ileft} = \left(\frac{1}{\Delta r^2} - \frac{1}{2r_{ileft}\Delta r}\right)(f_{ileft-1} - f_{ileft}) \quad (15)$$

$$J_h|_{iright} = \left(\frac{1}{\Delta r^2} + \frac{1}{2r_{iright}\Delta r}\right)H_{iright+1}^n \quad (16)$$

$$\left[-\frac{1}{r}\frac{\partial}{\partial r}(r(H^{n+1}-f)\langle v_r\rangle^{n+1}C^{n+1})\right]\Big|_{x=x_i} = \quad (17)$$
$$-\frac{(H_i^{n+1}-f_i)\frac{\langle v_r\rangle_{i+\frac{1}{2}}^{n+1}+\langle v_r\rangle_{i-\frac{1}{2}}^{n+1}}{2}C_i^{n+1}}{r_i} -$$
$$\frac{(H_{i+1}^{n+1}-f_{i+1})\frac{\langle v_r\rangle_{i+\frac{1}{2}}^{n+1}+\langle v_r\rangle_{i+\frac{3}{2}}^{n+1}}{2}C_{i+1}^{n+1} - (H_{i-1}^{n+1}-f_{i-1})\frac{\langle v_r\rangle_{i-\frac{1}{2}}^{n+1}+\langle v_r\rangle_{i-\frac{3}{2}}^{n+1}}{2}C_{i-1}^{n+1}}{2\Delta r}$$

$$\langle v_r\rangle_{i+\frac{1}{2}}^{n+1} = \langle v_r\rangle^{n+1}|_{x=x_{i+\frac{1}{2}}} \quad (18)$$
$$= \frac{1}{3Ca}\frac{1}{1+\eta_{sp_{i+\frac{1}{2}}}}\left(\frac{H_i^{n+1}+H_{i+1}^{n+1}}{2} - f_{i+\frac{1}{2}}\right)^2\frac{1}{\Delta r}(K|_{x=x_{i+1}} - K|_{x=x_i})$$

$$\left[\frac{1}{Sc}\frac{1}{r}\frac{\partial}{\partial r}\left(r(H^{n+1}-f)\frac{\partial C^{n+1}}{\partial r}\right)\right]_i = \quad (19)$$
$$\frac{1}{Sc}\frac{\left(r(H^{n+1}-f)\frac{\partial C^{n+1}}{\partial r}\right)_{i+\frac{1}{2}} - \left(r(H^{n+1}-f)\frac{\partial C^{n+1}}{\partial r}\right)_{i-\frac{1}{2}}}{r_i\Delta r}$$

$$\left(r(H^{n+1}-f)\frac{\partial C^{n+1}}{\partial r}\right)_{i+\frac{1}{2}} = r_{i+\frac{1}{2}}\left(\frac{H_i^{n+1}+H_{i+1}^{n+1}}{2} - f_{i+\frac{1}{2}}\right)\frac{C_{i+1}^{n+1} - C_i^{n+1}}{\Delta r} \quad (20)$$

$$r_i = \left(i - \frac{1}{2}\right)\Delta r \quad (21)$$

$$r_{i+\frac{1}{2}} = i\Delta r \quad (22)$$

$$\frac{\partial W}{\partial t} = -\frac{1}{r}\frac{\partial}{\partial r}(r\langle v_r\rangle W) + \frac{1}{Sc}\frac{1}{r}\frac{\partial}{\partial r}\left[r(H-f)\frac{\partial(W/(H-f))}{\partial r}\right] \quad (23)$$

$$M^n H^{n+1} = -\frac{1}{3Ca}\frac{1}{r}\frac{\partial}{\partial r}\left[\frac{r}{1+\eta_{sp}}(H^n-f)^3\frac{\partial}{\partial r}\left(\frac{\partial(H^{n+1})^2}{\partial r^2}+\frac{1}{r}\frac{\partial(H^{n+1})}{\partial r}\right)\right] \quad (24)$$

$$N^{n+1}W^{n+1} = \frac{1}{Sc}\frac{1}{r}\frac{\partial}{\partial r}\left(r(H^{n+1}-f)\frac{\partial\left(\frac{W^{n+1}}{H^{n+1}-f}\right)}{\partial r}\right) \quad (25)$$

$$L^{n+1}W^{n+1} = -\frac{1}{r}\frac{\partial}{\partial r}(r\langle u\rangle^{n+1}W^{n+1}) \quad (26)$$

$$\langle u\rangle^{n+1} = \frac{1}{3Ca}(H^{n+1}-f)^2\frac{\partial}{\partial r}\left(\frac{\partial(H^{n+1})^2}{\partial r^2}+\frac{1}{r}\frac{\partial(H^{n+1})}{\partial r}\right) \quad (27)$$

$$C^n = \frac{W^n}{H^n - f} \quad (28)$$

$$[I - \Delta t M^n]H^{n+1} = [I + \Delta t J_h]H^n - \Delta t E J^n \quad (29)$$

$$[I - \Delta t(L^{n+1} + N^{n+1})]W^{n+1} = IW^n \quad (30)$$

$$-\frac{1}{r}\frac{\partial}{\partial r}(r\langle v_r\rangle^{n+1}W^{n+1})\Big|_{x=x_i} = -\frac{r_i\langle v_r\rangle_{i+\frac{1}{2}}^{n+1}W_{i+\frac{1}{2}}^{n+1} - r_{i-\frac{1}{2}}\langle v_r\rangle_{i-\frac{1}{2}}^{n+1}W_{i-\frac{1}{2}}^{n+1}}{r_i\Delta r} \quad (31)$$

$$W_{i+\frac{1}{2}}^{n+1} = \begin{cases} W_{i+1}^{n+1} & \langle v_r\rangle_{i+\frac{1}{2}}^{n+1} \leq 0 \\ W_i^{n+1} & \langle v_r\rangle_{i+\frac{1}{2}}^{n+1} > 0 \end{cases} \quad (32)$$

$$W_{i-\frac{1}{2}}^{n+1} = \begin{cases} W_i^{n+1} & \langle v_r\rangle_{i-\frac{1}{2}}^{n+1} \leq 0 \\ W_{i-1}^{n+1} & \langle v_r\rangle_{i-\frac{1}{2}}^{n+1} > 0 \end{cases} \quad (33)$$

$$\left[\frac{1}{Sc}\frac{1}{r}\frac{\partial}{\partial r}\left(r(H^{n+1}-f)\frac{\partial\left(\frac{W^{n+1}}{H^{n+1}-f}\right)}{\partial r}\right)\right]_i = \quad (34)$$
$$\frac{1}{Sc}\frac{\left(r(H^{n+1}-f)\frac{\partial\left(\frac{W^{n+1}}{H^{n+1}-f}\right)}{\partial r}\right)_{i+\frac{1}{2}} - \left(r(H^{n+1}-f)\frac{\partial\left(\frac{W^{n+1}}{H^{n+1}-f}\right)}{\partial r}\right)_{i-\frac{1}{2}}}{r_i\Delta r}$$

$$\left[ r(H^{n+1} - f) \frac{\partial \left( \frac{W^{n+1}}{H^{n+1} - f} \right)}{\partial r} \right]_{i+\frac{1}{2}} = \qquad (35)$$

$$r_{i+\frac{1}{2}} \left( \frac{H_i^{n+1} + H_{i+1}^{n+1}}{2} - f_{i+\frac{1}{2}} \right) \frac{\left( \frac{W_{i+1}^{n+1}}{H_{i+1}^{n+1} - f_{i+1}} \right) - \left( \frac{W_i^{n+1}}{H_i^{n+1} - f_i} \right)}{\Delta r}$$

$$r_i = \left( i - \frac{1}{2} \right) \Delta r, \qquad (36)$$

$$r_{i+\frac{1}{2}} = i \Delta r \qquad (37)$$

What is claimed is:

1. A non-transitory computer-readable storage medium encoded with instructions for execution by a processor to perform a method for simulating evaporation of a droplet of a fluid, the instructions comprising:
    (a) instructions for tracking boundaries of saturation regions of the droplet;
    (b) instructions for setting the boundaries at a first, initial time;
    (c) instructions for solving, at the first initial time, a plurality of differential equations that represent diffusion in, and evaporation of, the droplet within the boundaries of the saturation regions through temporal and spatial discretization;
    (d) instructions for comparing a solute concentration in each of the saturation regions with a gelation concentration for the solute;
    (e) instructions for updating the boundaries based on the comparison; and
    (f) instructions for solving, at a second or next time, the plurality of differential equations within the updated boundaries of the saturation regions through temporal and spatial discretization.

2. The non-transitory computer-readable storage medium of claim 1, wherein the diffusion being represented is that of the solute in the droplet.

3. The non-transitory computer-readable storage medium of claim 1, wherein a finite difference method is used in solving the plurality of differential equations.

4. The non-transitory computer-readable storage medium of claim 1, wherein instructions (d), (e) and (f) are iteratively executed until a final time is reached.

5. A system for simulating evaporation of a droplet of a fluid, the system comprising:
    a processor configured to track boundaries of saturation regions of the droplet; set the boundaries at a first, initial time; solve, at the first initial time, a plurality of differential equations that represent diffusion in, and evaporation of, the droplet within the boundaries of the saturation regions through temporal and spatial discretization; compare a solute concentration in each of the saturation regions with a gelation concentration for the solute; update the boundaries based on the comparison; and solve, at a second or next time, the plurality of differential equations within the updated boundaries of the saturation regions through temporal and spatial discretization; and
    a display for displaying the simulation.

* * * * *